Nov. 25, 1952     A. SIMMON     2,619,007
TRANSPARENCY HOLDER FOR LANTERN SLIDE PROJECTORS
Filed May 16, 1951     2 SHEETS—SHEET 1
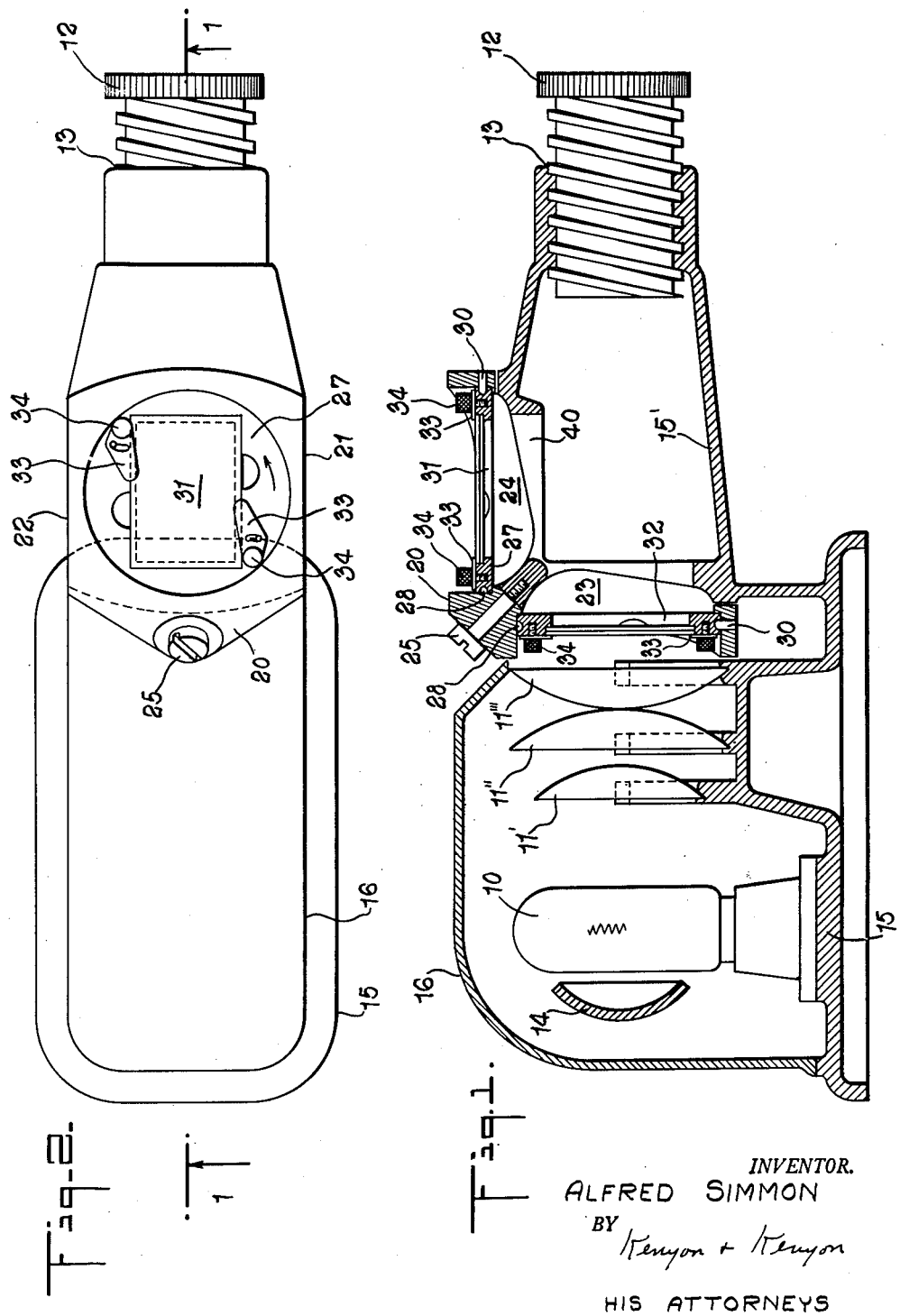
INVENTOR.
ALFRED SIMMON
BY Kenyon + Kenyon
HIS ATTORNEYS

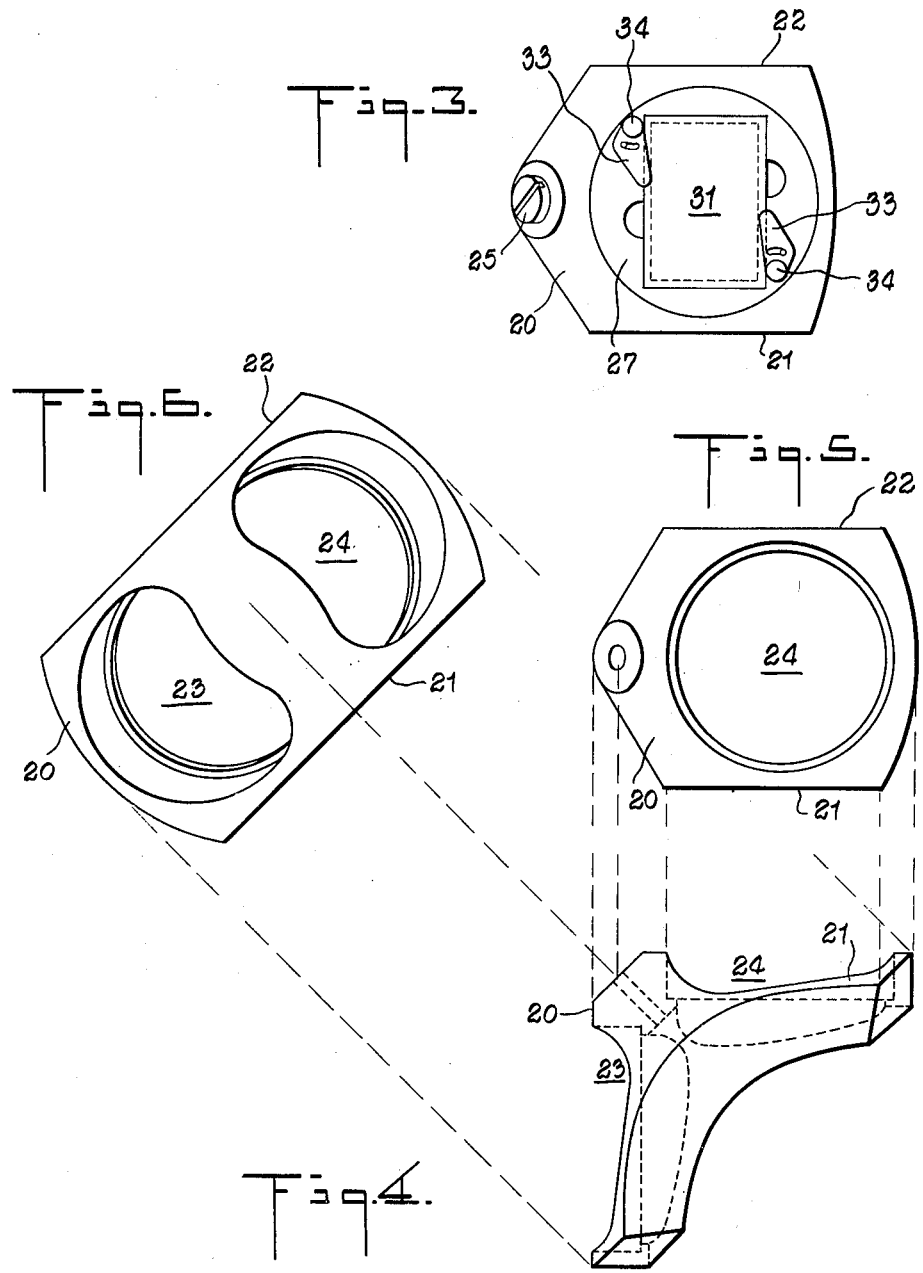

Patented Nov. 25, 1952

2,619,007

UNITED STATES PATENT OFFICE 2,619,007

TRANSPARENCY HOLDER FOR LANTERN SLIDE PROJECTORS

Alfred Simmon, Jackson Heights, N. Y., assignor to Simmon Brothers, Inc., Long Island City, N. Y., a corporation of New York Application May 16, 1951, Serial No. 226,633

4 Claims. (Cl. 88—27)

This invention relates to lantern slide projectors and particularly to such projectors having an improved transparency holder.

One of the objects of this invention is to provide such a projector with a very effective and compact transparency holder which does not add materially to the overall dimensions of the projector but which is convenient and easy to use.

Another object of the invention is to provide a projector with a transparency holder which makes it possible to display oblong, rectangular lantern slides in either horizontal or vertical position without having to provide square mounts therefor so that it is not necessary to sandwich the transparencies between glass plates provided with a mask which is a time-consuming and expensive operation.

Another object of the invention is to provide a projector with a transparency holder which facilitates the operation of the projector in that the operator of the projector may view the transparency after it has been placed in the holder and before it has been moved to projecting position.

Other objects and advantages of the invention will be apparent to those skilled in the art from the following specification and the drawings in which:

Fig. 1 is a cross-sectional view in a vertical plane of a projector embodying the invention;

Fig. 2 is a top plan view of the same projector;

Fig. 3 is a view of the transparency holder with the transparency mounted therein for projection in a horizontal position as opposed to a vertical position as shown in Fig. 2;

Figs. 4, 5 and 6 are detailed views of the holder for the transparencies.

The projector which is in most respects of conventional design comprises a light source 10, a triple condenser formed by lenses 11', 11'' and 11''', and a projecting lens 12 which is mounted in a helical mount 13 for focusing in a conventional manner. A mirror 14 backs the light source and a base 15, which may be a casting, serves to support the aforesaid elements. A hollow casing 15' extends from the lens mount 13 backwardly along and surrounding the optical axis of the projector to the station where the transparency to be projected is located when the projector is in use. A cover 16 houses the light source.

The transparency support is a rotatable member 20 which is generally cone-shaped and which has a central unobstructed portion and which has had its sides 21 and 22 cut off. It is provided with two circular apertures 23 and 24 and the angle of its apex is substantially 90°.

The transparency support is rotatably mounted on a pivotal mount 25 for rotation about the axis of a cone which is coincident with the pivotal mount 25 and which intersects the optical axis of the projector at a 45° angle.

The transparency holders lie substantially on the surface of this cone. They comprise disks 26 and 27 which overlie the apertures 23 and 24 and lie substantially in the surface of a cone having an axis coincidental with the pivotal member 25 and a surface which extends into the station for viewing the film where it is perpendicular to the optical axis of the projector. Thus, the transparencies in the holders may be positioned across the optical axis for projection as shown in Fig. 1.

The disks 26 and 27 are mounted for rotation in their own planes and may be held in position through engagement in groove 28 of a bullet catch 30 or the like.

Each of the disks 26 and 27 has a rectangular oblong aperture 31 and 32 adapted to accept the transparency. The transparency may be held in place by spring clips 33 which may be secured by knurled knobs 34 which serve also as handles to enable the operator to rotate the disks 31 and 32 so that they turn from a position, such as is shown in Fig. 2 where the transparency is positioned for projection on the screen in a vertical position, to a position such as is shown in Fig. 3 where the transparency is positioned for projection in a vertical plane on the screen.

Within the housing 15', in addition to the aperture which is adjacent the station for projection and on the optical axis, I provide a second aperture 40. This lies at the top of the housing 15' and is so positioned that one of the transparency holders is positioned thereover and in register therewith when the other holder is in position to permit projection of its transparency. This transparency is illuminated by light reflected from the interior walls of the hollow body 15 so that the operator of the projector may observe the transparency after he has placed it in the holder to make sure that it is properly positioned. He may then, while viewing the transparency, adjust its position as desired between the positions shown in Figs. 2 and 3. It takes very little light for this purpose and even the black paint which would normally be supplied inside of casing 15' will provide sufficient reflected light to judge the position and content of the transparency.

The transparency support 20 is rotatable about its axis 25 so that the transparency holders move in the path of the aforementioned cone which has the axis coincident with 25 and the surface which intersects the optical axis of the projector. The holders comprising the apertures 23 and 24 and the disks 26 and 27 lie substantially on the surface of this cone and present the transparency in a position tangent to this surface. When the member 20 is rotated, these transparency holders follow a path lying substantially on the surface of this cone and thus move from the projecting position to a position substantially parallel to the optical axis of the projector and opposite aperture 40 so that the operator may observe the transparency before swinging it to position. These holders are positioned on opposite sides of and symmetrical with respect to the open unobstructed center of the member 20 and symmetrical with respect to the axis of the cone.

A preferred form of the invention has been described. However, it is not intended by describing merely the preferred form to be limited to this particular form of the invention. Other forms of the invention may be employed.

I claim:

1. In a lantern slide projector having an optical axis and a station thereon for a transparency to be projected a transparency support mounted for rotation about the axis of a cone having an angle at its apex of approximately 90° and a surface perpendicular to said optical axis at said station and its axis intercepting said optical axis, said support having an unobstructed central portion and a pair of transparency holders disposed symmetrically with respect to the axis of said cone and said central portion and lying substantially on the surface of said cone and positioned to support transparencies substantially on said surface and in position to intercept said optical axis and a mount for said support spaced from said optical axis, whereby transparencies in said holders may be swung through a path on the surface of said cone from a position spaced from and substantially parallel to said optical axis to said station to intercept said optical axis for projection, and a housing disposed about said optical axis and about which said support may be rotated, said housing having a first aperture adjacent said station and in line with said optical axis and a second aperture spaced from and substantially parallel to said optical axis and on the path of movement of said holders and positioned from said first aperture a distance equal to the distance between said holders to align with one of said holders when the other of said holders is positioned at said station.

2. In a lantern slide projector having an optical axis and a station thereon for a transparency to be projected a transparency support mounted for rotation about the axis of a cone having a surface perpendicular to said optical axis at said station and its axis intercepting said optical axis at approximately 45°, said support having an unobstructed central portion and a pair of transparency holders disposed symmetrically with respect to the axis of said cone and said central portion and lying substantially on the surface of said cone and positioned to support transparencies substantially on said surface and in position to intercept said optical axis and a mount for said support spaced from said optical axis, whereby transparencies in said holders may be swung through a path on the surface of said cone from a position spaced from said optical axis to said station to intercept said optical axis for projection, and a housing disposed about said optical axis and about which said support may be rotated, said housing having a first aperture adjacent said station and in line with said optical axis and a second aperture spaced from said optical axis and on the path of movement of said holders and positioned from said first aperture a distance equal to the distance between said holders to align with one of said holders when the other of said holders is positioned at said station.

3. In a lantern slide projector having an optical axis and a station thereon for a transparency to be projected a transparency support mounted for rotation about the axis of a cone having an angle at its apex of approximately 90° and a surface perpendicular to said optical axis at said station and its axis intercepting said optical axis, said support having an unobstructed central portion and a pair of transparency holders disposed symmetrically with respect to the axis of said cone and said central portion and lying substantially on the surface of said cone and positioned to support transparencies substantially on said surface and in position to intercept said optical axis and a mount for said support spaced from said optical axis, whereby transparencies in said holders may be swung through a path on the surface of said cone from a position spaced from and substantially parallel to said optical axis to said station to intercept said optical axis for projection, and a housing disposed about said optical axis and about which said support may be rotated, said housing having a first aperture adjacent said station and in line with said optical axis and a second aperture spaced from and substantially parallel to said optical axis and on the path of movement of said holders and positioned from said first aperture a distance equal to the distance between said holders to align with one of said holders when the other of said holders is positioned at said station, each of said holders having an aperture lying substantially on the surface of said cone and having a disc overlying said aperture and mounted for rotation in its own plane and having a central rectangular aperture and retaining means for retaining a slide over said rectangular aperture whereby the position of said transparency may be adjusted by rotation of said disc.

4. In a lantern slide projector having an optical axis and a station thereon for a transparency to be projected a transparency support mounted for rotation about the axis of a cone having a surface perpendicular to said optical axis at said station and its axis intercepting said optical axis at approximately 45°, said support having an unobstructed central portion and a pair of transparency holders disposed symmetrically with respect to the axis of said cone and said central portion and lying substantially on the surface of said cone and positioned to support transparencies substantially on said surface and in position to intercept said optical axis and a mount for said support spaced from said optical axis, whereby transparencies in said holders may be swung through a path on the surface of said cone from a position spaced from said optical axis to said station to intercept said optical axis for projection, and a housing disposed about said optical axis and about which said support may be rotated, said housing having a first aperture adjacent said station and in line with said optical axis and a second aperture spaced from said optical axis and on the path of movement of said holders and positioned from said first aperture a distance equal to the distance between said holders to align with one of said holders when the other of said holders is positioned at said station, each of said holders having an aperture lying substantially on the surface of said cone and having a disc overlying said aperture and mounted for rotation in its own plane and having a central rectangular aperture and retaining means for retaining a slide over said rectangular aperture whereby the position of said transparency may be adjusted by rotation of said disc.

ALFRED SIMMON.

REFERENCES CITED

The following references are of record in the file of this patent:

UNITED STATES PATENTS

| Number | Name | Date |
|---|---|---|
| 1,407,906 | Wenderhold | Feb. 28, 1922 |
| 2,445,929 | Sturgess | July 27, 1948 |
| 2,552,225 | Simmons et al. | May 8, 1951 |

FOREIGN PATENTS

| Number | Country | Date |
|---|---|---|
| 205,788 | Great Britain | July 17, 1924 |